UNITED STATES PATENT OFFICE.

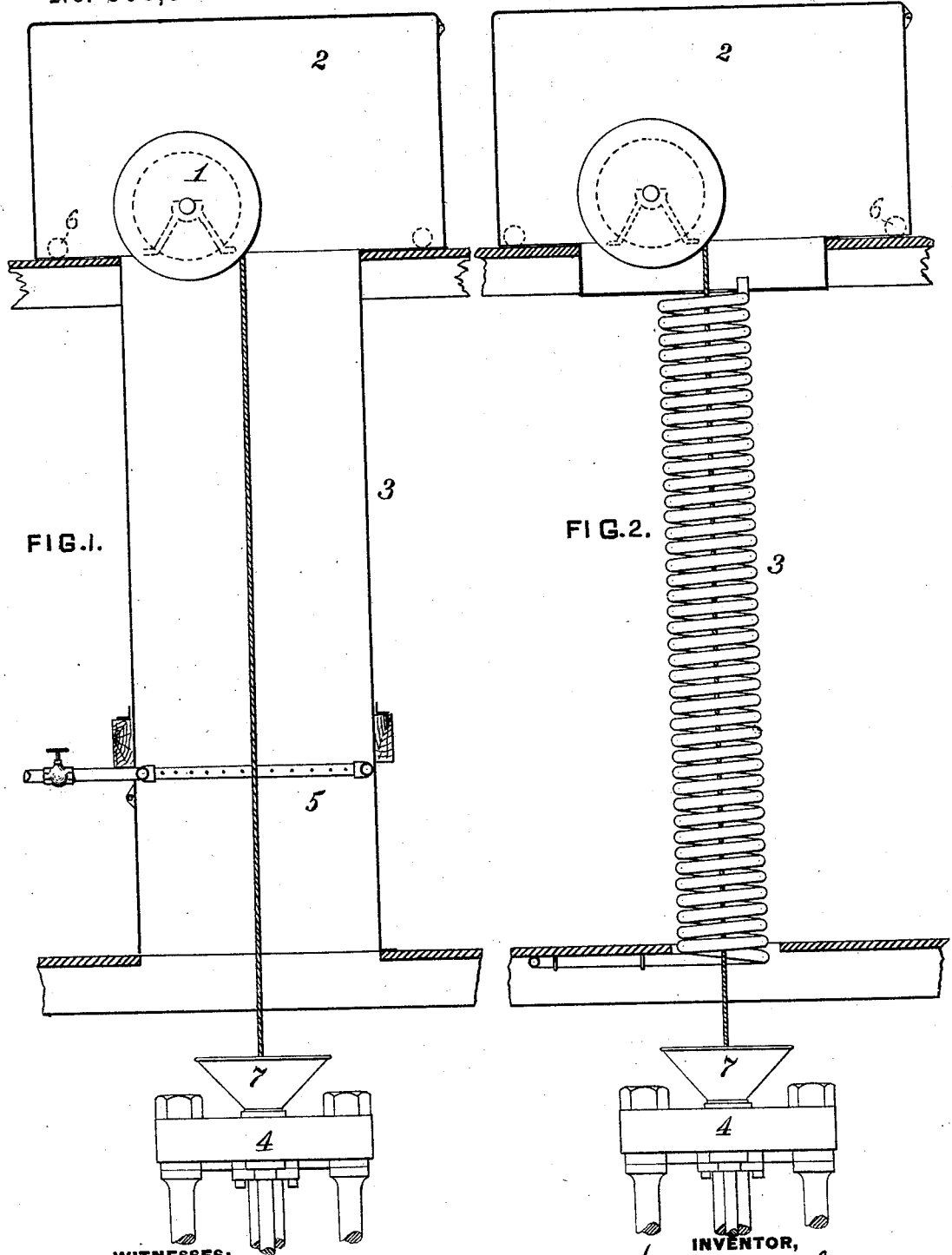

WILLIAM A. CONNER, OF PITTSBURG, PENNSYLVANIA, ASSIGNOR TO THE STANDARD UNDERGROUND CABLE COMPANY, OF SAME PLACE.

COVERING ELECTRIC CONDUCTORS.

SPECIFICATION forming part of Letters Patent No. 508,370, dated November 7, 1893.

Application filed December 6, 1890. Serial No. 373,807. (No model.)

*To all whom it may concern:*

Be it known that I, WILLIAM A. CONNER, a citizen of the United States, residing at Pittsburg, in the county of Allegheny and State of Pennsylvania, have invented or discovered certain new and useful Improvements in Manufacturing Electric Wires or Cables, of which improvement the following is a specification.

The invention described herein relates to certain improvements in the manufacture of electric cables, whereby the insulation of the cable is maintained in a soft pliable condition, while the cable is being covered and the liability of the insulation being broken or injured is avoided.

In general terms, the invention consists in the construction and combination of mechanical devices or elements, all as more fully hereinafter described and claimed.

In the accompanying drawings forming a part of this specification, Figure 1 is a sectional elevation of the apparatus employed in the practice of my invention, and Fig. 2 is a similar view of a modification of such apparatus.

It is a characteristic of most insulating materials that after becoming cool on the wire or cables, it is stiff and hard and sometimes quite brittle, so that it is with great difficulty that such wires or cables can be subsequently covered, and there is considerable liability of the insulating material being broken or injured during the covering operation.

In the practice of my invention the reel or spool 1 having the insulated material coiled thereon is arranged in a box or receptacle 2, the shaft of the spool or reel being mounted on supports as shown in dotted lines, so that the reel may rotate freely. As the cable is drawn off from the reel it is passed through a hollow shaft 3 to the covering apparatus, *e. g.* the lead press 4. As shown in Fig. 1, this shaft may be formed of a sheet metal tube, which is heated by suitably arranged gas jets 5, or in any other suitable manner. In lieu of the sheet metal tube, the shaft may be formed by spirally coiled pipe as shown in Fig. 2, through which steam or hot air is caused to pass. The shaft may be so arranged with relation to the box 1, that the heat from the shaft will pass into the box, thereby heating the cable before it is unwound from the reel or spool, and maintaining it at such temperature until it passes into the covering apparatus; or the shaft may be made sufficiently long to permit of raising the cable to the proper temperature while passing therethrough.

In order to facilitate the adjustment of the reel on its supports, it is preferred to mount the box or receptacle on rollers 6 as shown in dotted lines, and one end or side of the box is hinged, thereby permitting the box to be easily moved over the reel after the latter has been placed in position.

The temperature of the shaft and box is so regulated as to render the insulating material flexible, without becoming fluid, so that it will flow off the wire or cable.

In some cases the wire or cable is not evenly protected with insulating material or the latter is accidentally scraped or broken off in handling. In order to correct such defects, a funnel shaped vessel 7, constructed to closely surround the wire or cable is arranged in proximity to the exit end of the shaft 3, preferably at the mouth of the core bar of the press. This vessel is filled with insulating material kept in a fluid condition by the application of heat thereto in any suitable manner.

I claim herein as my invention—

1. The combination of mechanism for applying a protective covering to wire or cable, with a heated shaft, whereby the wire may be heated prior to the application of the protective covering, substantially as set forth.

2. The combination of a box or receptacle for the reel containing the wire or cable, an apparatus for applying a protective covering to the wire or cable, a hollow shaft interposed between the box and covering apparatus, and means for heating the shaft and box, substantially as set forth.

3. The combination of mechanism for applying a protective covering to a wire or cable, a heated shaft, whereby the wire may be heated prior to the application of the protective covering and a vessel interposed between the heated shaft and the covering mechanism for applying insulation to the wire or cable, substantially as set forth.

In testimony whereof I have hereunto set my hand.

WILLIAM A. CONNER.

Witnesses:
R. H. WHITTLESEY,
DARWIN S. WOLCOTT.